(No Model.)　　　　　　J. W. YOUNG.　　　2 Sheets—Sheet 1
GRIPPING MECHANISM FOR TRACTION CABLE RAILROADS.
No. 294,948.　　　　　　　　Patented Mar. 11, 1884.
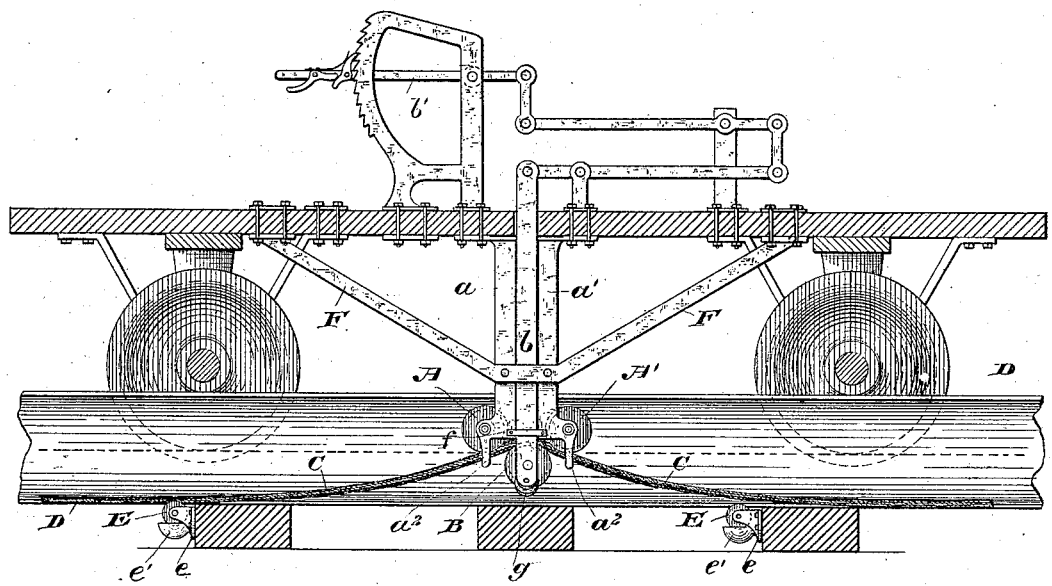
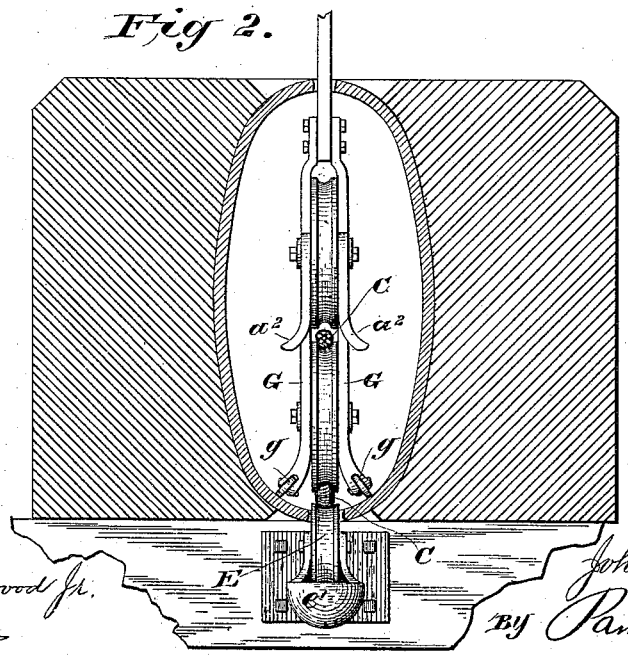

(No Model.) 2 Sheets—Sheet 2.
J. W. YOUNG.
GRIPPING MECHANISM FOR TRACTION CABLE RAILROADS.
No. 294,948. Patented Mar. 11, 1884.
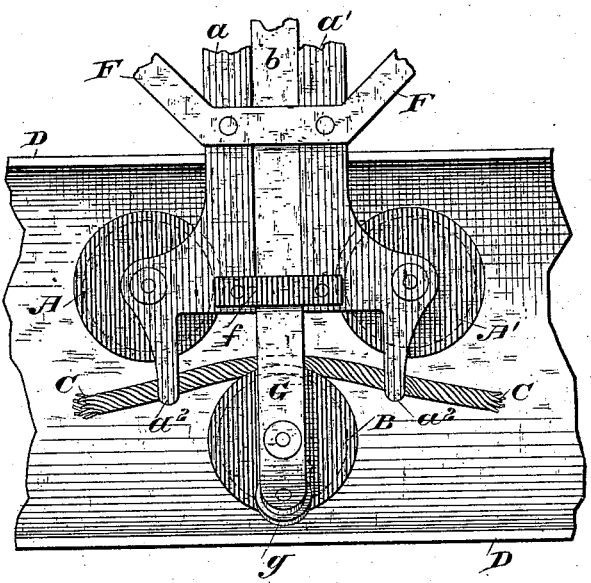
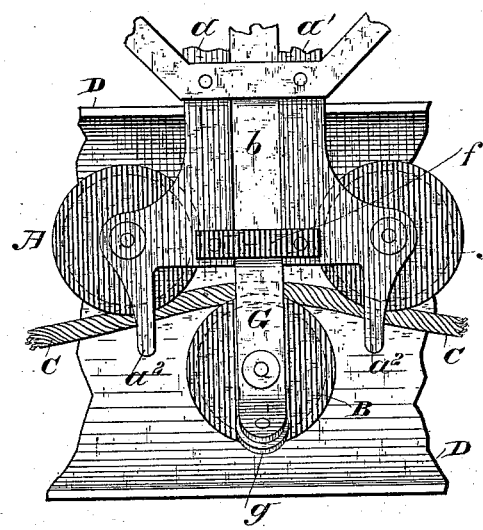
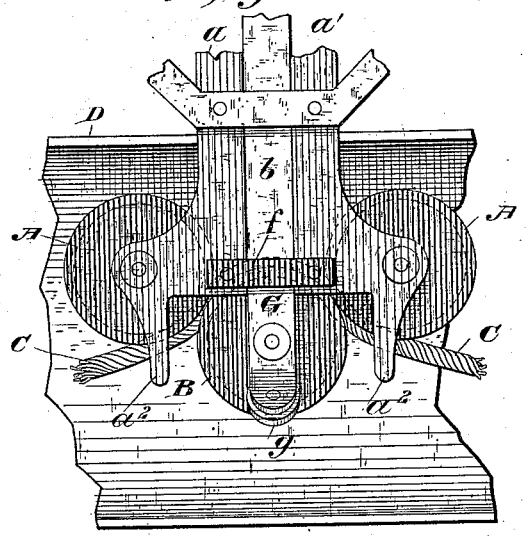

UNITED STATES PATENT OFFICE.

JOHN W. YOUNG, OF FORT MARONI, ARIZONA TERRITORY.

GRIPPING MECHANISM FOR TRACTION-CABLE RAILROADS.

SPECIFICATION forming part of Letters Patent No. 294,948, dated March 11, 1884.

Application filed March 17, 1883. (No model.)

*To all whom it may concern:*

Be it known that I, JOHN W. YOUNG, a citizen of the United States, residing at Fort Maroni, in the county of Yavapai and Territory of Arizona, have invented certain new and useful Improvements in Gripping Mechanism for Traction-Cable Railroads; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to the class of gripping mechanisms for railroads using traction-cables which employ rollers or sheaves for gripping the cable that are not opposite to each other. Heretofore such gripping mechanisms, as applied to traction-cables, have been made with three sheaves, two being placed on one side of the cable and one on the opposite side midway between, the distance between the periphery of the two sheaves being greater than the diameter of the opposite sheave, or the construction of the grooves of the sheaves such that a positive grip cannot be given. The grip is applied by gradually drawing the single sheave in toward the pair of sheaves, which causes the cable to slightly buckle in between the sheaves. In all grips of this class the hold is due to the friction of the sheaves on the cable, and no positive grip is secured, as in other classes of grip mechanisms, by pinching the cable between opposite sheaves or rollers.

The object of my invention is to provide a grip mechanism that, when applied, does not pinch the cable at first, but applies an elastic pressure that allows the car to start without a jerk, the cable slipping through the grip until the speed of the car is equal to that of the cable when a positive grip is secured.

My invention consists in constructing the grip mechanism of a traction-cable car so that the distance between the periphery of the two sheaves is less than the diameter of the single opposite sheave, with twice the thickness of the cable added, so that the cable may be pinched between the pair of sheaves and the single sheave, if the single sheave is drawn in far enough, the construction of the grooves of the sheaves being such as will permit the cable to be pinched between the sheaves; and it also consists in constructing the frame of the lower sheave so that it can rest on the bottom of the cable-guide and form a supporting-sheave for the cable when the car is stationary, relieving it from the strain of the running cable.

In the accompanying drawings, Figure 1 illustrates my grip mechanism applied to a platform-car. Fig. 2 is a cross-section through the cable-guide, showing a front elevation of the gripping-sheaves and an anti-friction pulley for supporting the cable. Figs. 3, 4, and 5 are side elevations of the sheaves, showing the different positions of the lower sheave when raised and lowered.

The pair of rollers are represented by A A', carried by hangers $a$ $a'$, extending down from the bottom of the car between the trucks. The lower sheave, B, travels below the cable C. Its hanger $b$ passes up between the hangers $a$ $a'$, and is connected above with proper mechanism for raising it. Either a system of compound levers, by which a long movement of the handle $b'$ is required, or the upper end of the hanger-rod $b$ may be rounded and have a screw-thread thereon, and a screw-collar turning on the same, with a fixed bearing and worked by a hand-wheel, will give the operator perfect control of the grip. Any controlling device may be used, but for a grip strong enough to draw a train considerable power is required. The stationary hangers $a$ $a'$ are made to extend down alongside of the movable hanger $b$, forming guides for it and giving it lateral support, and they in turn are longitudinally braced by rods F and connecting-plates $f$. The outwardly-curved extensions $a^2$ of the stationary hangers project below their sheaves and form guides to retain the cable in its place in the sheaves. The hanger for the lower sheave is made with the legs G extending downward and outward on both sides, in order that they may clear the anti-friction rollers and rest on the bottom of the cable-guide. They support the sheave B and cable when the train is at rest, thus relieving the grip mechanism of the task of supporting the running cable. The ends of the legs have the small rollers $g$, to prevent the unnecessary wear of the lining of the cable-guide due to the dragging of the legs along the bottom when the sheave has been lowered and the train is being braked up. The axle of the sheave B is made removable, so that the sheave can be taken out of its hanger to insert or remove the cable. The shortest distance between cable-grooves of the sheaves A A' must be less than the diameter of the sheave B plus twice the thickness of the cable; otherwise, no matter how high the sheave B is raised, there is no positive gripping of the cable, as it can buckle around the sheaves; but when constructed as above described a positive grip is secured. When the single sheave is first brought up against the cable midway between the bearing-points of the two opposite sheaves A A', as is shown in Fig. 4, the friction is elastic, due to the tension of the cable, which is permitted to slip through between the sheaves, the pressure being gradually tightened until the speed of the car equals that of the cable. If the grip is applied with sufficient power to raise the sheave B to the highest position, (indicated in Fig. 5,) then the cable will be pinched between rollers B and A and B and A', and the grip becomes a positive one.

In the present case the invention is shown as adapted to elevated railroads, D being the cable-guide, and E anti-friction rollers on which the cable rests, the rollers being placed beneath the cable-guide and just projecting into it through slots in the bottom. They are journaled in lugs e, riveted to a cross-tie, and a drip-cup, e', is placed beneath each roller.

The grip mechanism is herein shown with the sheaves in a vertical plane; but the main feature of my invention is not restricted to such an arrangement, as they can be placed in a horizontal plane, or above, or at the side of the car for an overhead or side traction-cable, and changes may be made in the hangings of the sheaves and the devices for operating the grip without deviating from the essential feature as above described. Of course more or less sheaves than three may be used, if necessary, and still embody my invention— as, for instance, three on one side of the cable, and two on the opposite side alternating with them—and the power for applying the grip may be made to act on either set of sheaves, or on both sets of sheaves equally, instead of on the lower sheave, as shown. It will also be practicable to employ my invention with but a single sheave on each side of the cable, provided they are not opposite to each other, but are so placed that when the lower sheave is first raised it will cause a slight buckle in the cable, and will afterward give a positive grip by pinching the cable between the two sheaves.

It will be observed that the action of the sheaves A and B upon the cable and with respect to each other will be the same if the sheave A' is removed as it is in combination with it.

I am aware that tension-brakes having three sheaves arranged with respect to each other in the manner herein described have been employed in connection with warping-engines on a fast rope for the purpose of making the rope taut in front of the warping-drum, the rope being drawn through the tension-brake by the warping-engine, and I do not claim the same, broadly; but I am not aware that the same has heretofore been used as a grip on a traction-cable to give both a gradual and positive grip where the cable is constantly running at a fixed speed.

What I claim as new is—

1. In a grip mechanism for traction-cables, the combination of two sheaves for gripping an endless traveling cable with mechanism for operating one or both of the sheaves, said sheaves not being directly opposite to each other with respect to the cable, but so arranged that they will press on both sides of the cable when the grip is applied to its full extent, substantially as and for the purpose set forth.

2. In a grip mechanism for traction-cables, the combination of two sets of sheaves for gripping an endless traveling cable, one of which sets may consist of a single sheave, with mechanism for operating one or both sets of sheaves, said sheaves alternating with each other, and arranged so that they will press on both sides of the cable when the grip is applied to its full extent, substantially as and for the purpose set forth.

3. In a grip mechanism for endless traveling traction-cables, the combination of sheaves A A' and sheave B with mechanism for drawing the latter sheave in toward the former pair of sheaves, the sheave B being placed opposite the space between the sheaves A A', and the width of the space between the sheaves A and A' being less than the diameter of the sheave B plus twice the thickness of the cable to be used, said sheaves being constructed so that they will pinch the cable when the grip is applied to its full extent, substantially as and for the purpose set forth.

4. In a grip mechanism for endless traction-cables, the combination of the movable hanger b, supporting-legs G, and cable-lifting sheave B, journaled in said legs, with the cable-guide D, and suitable cable-gripping and sheave-lifting devices on a car, substantially as herein set forth.

5. In a grip mechanism for endless traction-cables, the combination of the stationary hangers a a', having bottom outwardly-turned guides, $a^2$, with the sheaves A A' and the movable hanger b and sheave B, substantially as and for the purpose set forth.

In testimony whereof I affix my signature in presence of two witnesses.

JNO. W. YOUNG.

Witnesses:
LESTER TURNER,
GEO. E. SIMPSON.